United States Patent
Johnson et al.

(10) Patent No.: US 11,948,603 B1
(45) Date of Patent: Apr. 2, 2024

(54) OPTIMIZE POWER, RTV, AND COUPLED PES DURING SEEK OPERATIONS

(71) Applicant: Western Digital Technologies, Inc., San Jose, CA (US)

(72) Inventors: Brian Johnson, Laguna Hills, CA (US); Jaesoo Byoun, Irvine, CA (US); Gaku Ikedo, Fujisawa (JP); Hideaki Ito, Fujisawa (JP); Naoyuki Kagami, Fujisawa (JP); Yasunori Fukuyama, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/945,187

(22) Filed: Sep. 15, 2022

(51) Int. Cl.
  *G11B 5/54* (2006.01)
  *G11B 5/55* (2006.01)
  *G11B 21/08* (2006.01)

(52) U.S. Cl.
  CPC .................................. *G11B 21/08* (2013.01)

(58) Field of Classification Search
  CPC ......... G11B 5/54; G11B 27/36; G11B 5/5547; G11B 5/5543; G11B 21/02; G11B 5/56; G11B 5/5552; G11B 5/5556
  USPC .............................................. 360/75, 77.02
  See application file for complete search history.

(56) References Cited

U.S. PATENT DOCUMENTS

| | | | |
|---|---|---|---|
| 5,986,426 A | 11/1999 | Rowan | |
| 6,903,894 B2 * | 6/2005 | Kokami | G11B 5/5547 360/77.02 |
| 6,922,299 B2 | 7/2005 | Sakamoto | |
| 6,989,955 B2 * | 1/2006 | Ziemer | G11B 5/59605 360/77.02 |
| 6,995,537 B1 | 2/2006 | Plutowski et al. | |
| 7,068,455 B2 | 6/2006 | Tanner | |
| 8,144,420 B1 | 3/2012 | Li et al. | |
| 9,424,868 B1 | 8/2016 | Nicholls et al. | |
| 2005/0174678 A1 | 8/2005 | Zayas et al. | |
| 2010/0177444 A1 | 7/2010 | Kokami et al. | |

OTHER PUBLICATIONS

Dallago et al., "A Switching Current-Mode Power Stage Based on Sigma-Delta Modulation", IEEE, pp. 637-641, 2001.

* cited by examiner

*Primary Examiner* — Nabil Z Hindi
(74) *Attorney, Agent, or Firm* — Neugeboren O'Dowd PC

(57) ABSTRACT

Various illustrative aspects are directed to a data storage device comprising one or more disks, an actuator arm assembly comprising a voice coil motor (VCM), the VCM configured to operate in a first mode and a second, different mode, wherein the first mode corresponds to at least a first and a second setting, and a control circuitry configured to cause the VCM to seek towards a target track in the first mode using the first setting for a first duration, control transition of the VCM from the first to the second setting in the first mode, cause the VCM to seek towards the target track using the second setting for a second duration, and control transition of the VCM from the first to a second mode, wherein controlling the transitioning comprises seeking the VCM toward the target track in the second mode for a third duration.

30 Claims, 10 Drawing Sheets

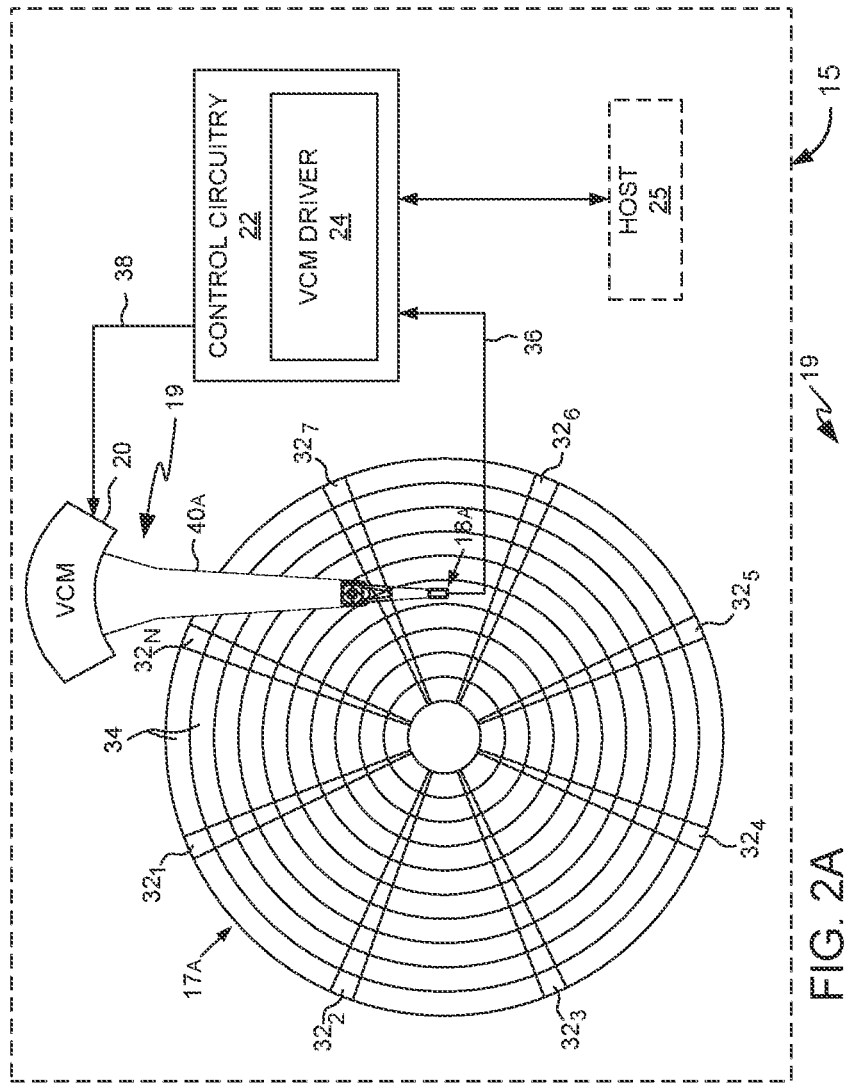
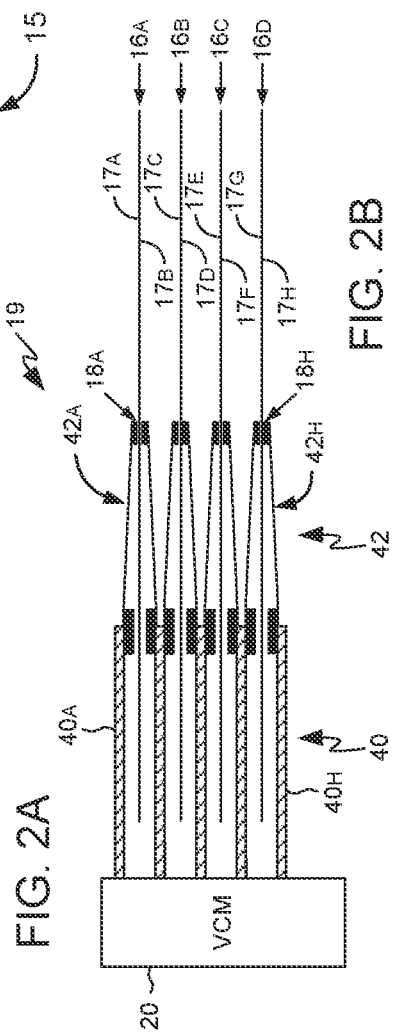
FIG. 2A
FIG. 2B

OPTIMIZE POWER, RTV, AND COUPLED PES DURING SEEK OPERATIONS

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges 6₀-6N recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Broadly, a seek may comprise two phases: a coarse seek phase, in which the voice coil motor (VCM) operates in a pulse-width modulation (PWM) mode to save power, and a fine seek phase, in which the VCM operates in a linear mode for more accurate positioning control with the trade-off being higher power consumption. In some aspects, optimization of seek operations can be viewed as a balance between optimizing positioning accuracy and optimizing power consumption. In some cases, when a VCM transitions from a PWM mode to a linear mode, an offset is introduced (herein referred to as the transition offset or transition current offset). This offset, which may be a steady-state offset between the two modes, may cause the PES to increase (i.e., worsen). Aspects of the present disclosure are directed to compensating for (or reducing) this offset between the two modes, which serves to optimize the PES (e.g., seeking actuator's track arrival PES or random transient vibrations (RTV)), as well as power consumption (e.g., by allowing the VCM to be operated in the PWM mode for a longer duration). Additionally, the present disclosure also helps optimize the coupled PES (or cPES), for instance, for a HDD utilizing two or more actuators, where the cPES is induced as a result of a seeking actuator's motion coupling with a non-seeking actuator. In some cases, the cPES is affected by one or more factors, such as, the PWM mode settings (e.g., PWM frequency, slew rate settings).

Furthermore, in the prior art, the VCM PWM frequency and/or slew rate settings are pre-set (limited ability to change them later) to reduce the PES and random transient vibrations (RTV). Contrastingly, the present disclosure enables a higher degree of flexibility for the VCM PWM frequency and/or slew rate settings, as compared to the prior art. In this way, the value(s) for the VCM PWM frequency and/or slew rate may be selected such that they optimize power consumption and the PES. Typically, a PWM mode setting (e.g., PWM frequency, slew rate, or a PWM-slew rate combination) corresponding to a lower transition offset is utilized to optimize the seek settling performance. However, a static PWM mode setting (e.g., the use of a single PWM frequency-slew rate combination for operating in the PWM mode) may not help harness the full range of power saving benefits provided by different PWM mode settings. Aspects of the present disclosure are directed to utilizing a plurality of VCM PWM frequency-slew rate combinations during the PWM mode of a seek operation, which may serve to optimize or reduce power consumption, random transient vibrations (RTV), and/or cPES, as compared to the prior art.

Various illustrative aspects are directed to a data storage device comprising: one or more disks; an actuator arm assembly comprising one or more disk heads and a first voice coil motor (VCM), the first VCM configured to operate in a first mode and a second mode, the first mode being different from the second mode, and wherein the first mode corresponds to a plurality of settings, including at least a first setting and a second setting. The data storage device further comprises one or more processing devices (also referred to as a control circuitry) configured to cause the first VCM to seek towards a target track in the first mode using the first setting for a first duration, control transition of the first VCM from under the first mode using the first setting to the second setting, cause the first VCM to seek towards the target track in the first mode using the second setting for a second duration, and control transition of the first VCM from under the first mode to a second mode, wherein controlling the transitioning comprises seeking the first VCM toward the target track in the second mode for a third duration.

Various illustrative aspects are directed to a data storage device comprising: one or more disks; an actuator arm assembly comprising one or more disk heads and a first voice coil motor (VCM), the first VCM configured to operate in a pulse width modulation (PWM) mode, and one or more processing devices configured to perform a calibration routine, wherein performing the calibration routine comprises identifying a mapping between pairs of setting values for the PWM mode and a track arrival position error signal (PES), wherein each pair of setting values translates to a current offset applied to the first VCM in the PWM mode. In some implementations, the mapping is identified by (1) measuring the track arrival PES for different pairs of setting values after seek completion, and (2) incrementally reducing a PWM change time and measuring a corresponding track arrival PES.

Various illustrative aspects are directed to a method of operating a data storage device, comprising actuating, by one or more processing devices, a first voice coil motor (VCM), causing the first VCM to seek towards a target track in a first mode using a first setting for a first duration, controlling transition of the first VCM from under the first mode using the first setting to a second setting, the first setting being different from the second setting, and wherein the first setting corresponds to a first transition current offset and the second setting corresponds to a second transition current offset, causing the first VCM to seek towards the target track in the first mode using the second setting for a second duration, and controlling transition of the first VCM from under the first mode to a second mode, wherein controlling the transition comprises seeking the first VCM toward the target track in the second mode for a third duration.

Various illustrative aspects are directed to one or more processing devices comprising means for actuating a first voice coil motor (VCM), means for causing the first VCM to seek towards a target track in a first mode using a first setting for a first duration, means for controlling transition of the first VCM from under the first mode using the first setting to a second setting, the first setting being different from the second setting, and wherein the first setting corresponds to a first transition current offset and the second setting corresponds to a second transition current offset, means for causing the first VCM to seek towards the target track in the first mode using the second setting for a second duration, and means for controlling transition of the first VCM from under the first mode to a second mode, wherein the means for controlling transition of the first VCM comprises means for seeking the first VCM toward the target track in the second mode for a third duration.

In some implementations of the data storage device, the method, and the one or more processing devices described herein, the first mode comprises a pulse width modulation (PWM) mode and the second mode comprises a linear or a current control loop (CCL) mode.

In some implementations of the data storage device, the method, and the one or more processing devices described herein, each of the plurality of settings corresponds to a plurality of parameters, including at least a first parameter and a second parameter.

In some implementations of the data storage device, the method, and the one or more processing devices described herein, the first parameter comprises a PWM frequency, and the second parameter comprises a slew rate of a current applied to or generated by the first VCM.

In some implementations of the data storage device, the method, and the one or more processing devices described herein, each of the plurality of settings corresponds to a different PWM frequency and slew rate combination.

In some implementations of the data storage device, the method, and the one or more processing devices described herein, controlling transition of the first VCM from under the first mode using the first setting to the second setting comprises changing, at or near end of the first duration, at least one of the plurality of parameters of the first setting. In some implementations of the data storage device, the method, and the one or more processing devices described herein, at least one of the first and the second parameter of the second setting is different from a corresponding one of the first setting.

In some implementations of the data storage device, the method, and the one or more processing devices described herein, the first duration is longer than one or more of the second duration and the third duration. In some implementations of the data storage device, the method, and the one or more processing devices described herein, the second duration is longer than the third duration.

In some implementations of the data storage device, the method, and the one or more processing devices described herein, the first mode corresponds to a plurality of transition current offsets, one for each setting. In some implementations of the data storage device, the method, and the one or more processing devices described herein, the second mode corresponds to a transition current offset.

In some implementations of the data storage device, the method, and the one or more processing devices described herein, the first setting corresponds to a first transition current offset and the second setting corresponds to a second transition current offset, the second transition current offset different from the first transition current offset, and wherein a difference between the second transition current offset and the transition current offset corresponding to the second mode is less than a difference between the first transition current offset and the transition current offset corresponding to the second mode.

In some implementations of the data storage device, the method, and the one or more processing devices described herein, the first mode comprises a pulse width modulation (PWM) mode, and the second mode comprises a linear or current control loop (CCL) mode.

Some implementations of the data storage device, the method, and the one or more processing devices described herein further include processes, features, means or instructions for (1) selecting the first setting, (2) selecting the second setting, wherein the second setting is applied to the first VCM after the first setting, (3) determining a PWM change time, wherein the PWM change time corresponds to a time at which the first VCM transitions from the first to the second setting for the PWM mode, (4) monitoring a first track arrival position error signal (PES), the first track arrival PES corresponding to a PES after a first calibration seek using the first setting, the second setting, and the PWM change time, and after the third duration is complete, (5) updating one or more of the first setting, the second setting, and the PWM change time, (6) monitoring a second track arrival PES, the second track arrival PES corresponding to a PES after a second calibration seek using one or more of the updated first setting, the updated setting, and the updated PWM change time, and after the third duration is complete, and (7) comparing the first and the second track arrival PES to determine an optimal PWM change time and optimal first and second settings for the PWM mode.

In some implementations of the data storage device, the method, and the one or more processing devices described herein, the data storage device is a dual actuator drive, wherein the actuator arm assembly comprises a second VCM. In some embodiments, the second VCM is configured to be controlled independently of the first VCM. That is, the one or more processing devices are configured to control the second VCM independently of the first VCM.

In some implementations of the data storage device, the method, and the one or more processing devices described herein, the data storage device comprises a second VCM, wherein the first VCM is a seeking actuator and the second VCM is a non-seeking actuator. In some implementations of the data storage device, the method, and the one or more processing devices described herein, seeking the first VCM towards the target track in the first mode induces a coupled position error signal (cPES) in the second VCM, the cPES based at least in part on a motion of the seeking actuator coupling into the non-seeking actuator.

In some implementations of the data storage device, the method, and the one or more processing devices described herein, the first setting corresponds to a first PWM frequency and first slew rate combination, and the second setting corresponds to a second PWM frequency and second slew rate combination, wherein the first PWM frequency is lower than the second PWM frequency and the first slew rate is higher than the second slew rate. In some cases, the use of a lower frequency-higher slew rate combination for the first setting and a higher frequency-lower slew rate combination for the second setting (i.e., while the first VCM or seeking actuator is operating in the PWM mode) serves to optimize (or reduce) the cPES induced in the second VCM (i.e., non-seeking actuator) as a result of the motion of the first VCM (i.e., seeking actuator).

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIGS. 2A and 2B illustrate conceptual block diagrams of a top view and a side view of a data storage device in the form of a disk drive, in accordance with aspects of the present disclosure.

DETAILED DESCRIPTION

Figure 1:
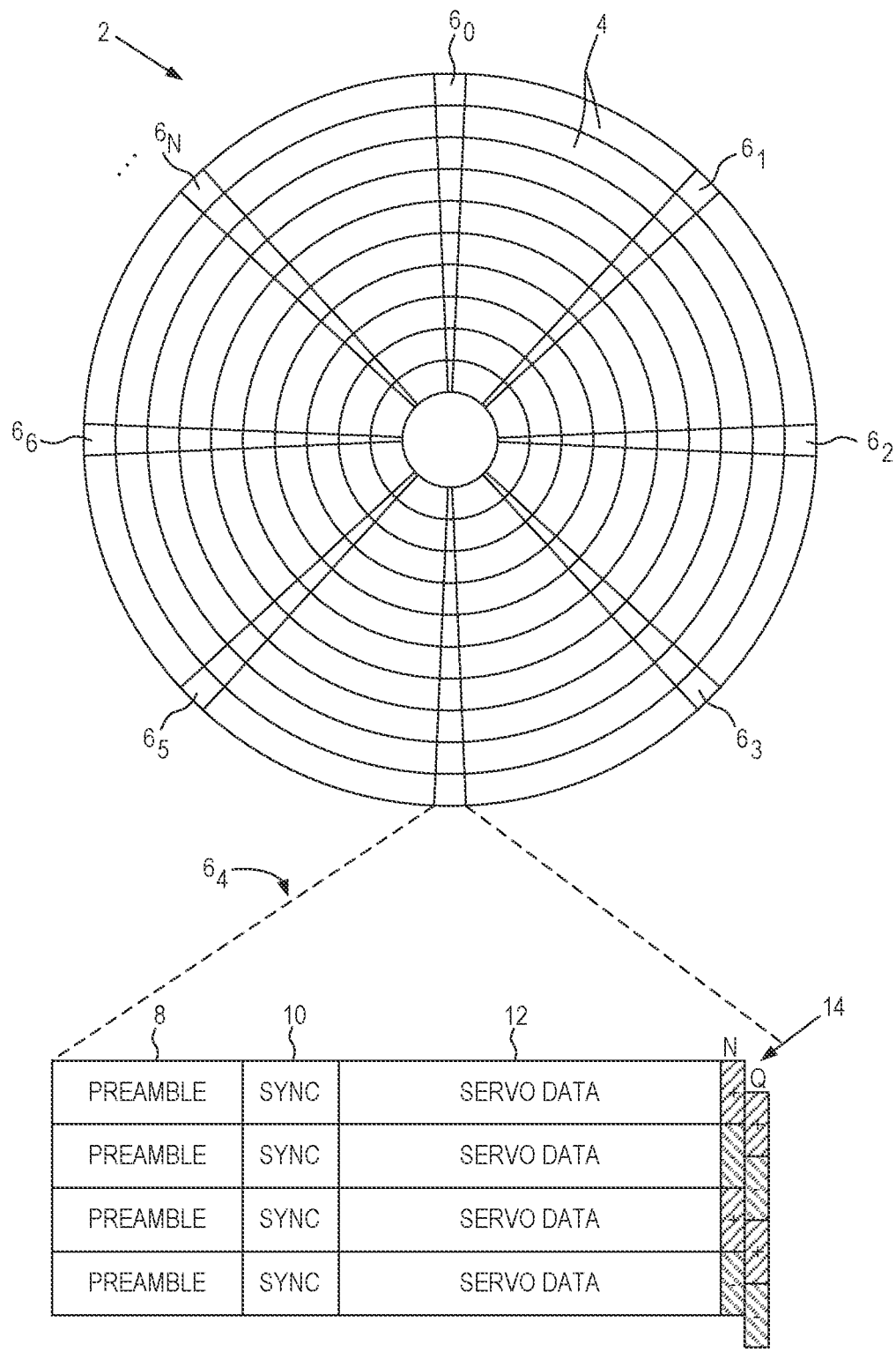
FIG. 1 shows a prior art disk format as comprising a number of radially-spaced, concentric servo tracks defined by servo wedges recorded around the circumference of each servo track.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the invention to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

As noted above, typically, a single PWM mode setting (e.g., single PWM frequency-slew rate combination) corresponding to a lower transition offset is utilized to enhance settling performance (e.g., reduce random transient vibrations or RTV) during seek operations. However, a static PWM mode setting (e.g., the use of a single PWM frequency-slew rate combination for operating in the PWM mode) may not help harness the full range of power saving benefits provided by different PWM mode settings. For example, some pairs of setting values (i.e., frequency-slew rate combinations used while the VCM is operating in the PWM mode) provide power savings, while others provide better RTV settling performance. Broadly, aspects of the present disclosure are directed to utilizing a plurality of VCM PWM frequency-slew rate combinations during the PWM mode of a seek operation, which serves to optimize or reduce power consumption, random transient vibrations (RTV), and/or cPES, as compared to the prior art.

In one non-limiting example, two different VCM PWM/slew rate settings (i.e., two different pairs of setting values) may be utilized to optimize the power, seek settling, and/or RTV during the PWM phase of a seek operation. During the beginning of the seek operation, a first PWM setting (e.g., lower PWM frequency and higher slew rate combination) corresponding to lower power consumption may be utilized. Additionally, near the end of the PWM mode of the seek operation (or during the end of the seek operation), a different PWM setting (i.e., different PWM frequency-slew rate combination) corresponding to better RTV settling performance may be utilized. It should be noted that, the number of PWM frequency-slew rate combinations is not intended to be limiting and more than two frequency-slew rate combinations may be utilized in different embodiments. In some cases, aspects of the disclosure may also include determining an optimal time (herein referred to as "PWM change time") at which the VCM should switch from the first PWM frequency/slew rate combination to the second PWM frequency/slew rate combination, and so on. Furthermore, in some examples, one of the setting values (e.g., PWM frequency or slew rate) may be the same or substantially similar between the first and the second pairs of settling values. That is, different PWM frequency/slew rate combinations may utilize the same PWM frequency (e.g., 210 kHz) and a different slew rate (e.g., 50 V/μs, 200 V/μs), or a different PWM frequency (e.g., 210 kHz, 300 kHz, 90 kHz) and the same slew rate (e.g., 50 V/μs).

In some cases, the power large scale integrated circuit (PLSI) comprises a voice coil motor (VCM) driver (shown as VCM driver 902 in FIG. 9), where the VCM driver applies current to the VCM to actuate the VCM. During a seek operation, the VCM driver (also referred to as a power driver of the VCM) is primarily driven in a pulse width modulation (PWM) mode, which serves to reduce power consumption. However, as the actuator arm assembly comprising the disk heads approaches the target track, the control circuitry 22 switches the drive operation to a linear mode. While the linear mode consumes more power than the PWM mode, it allows for improved accuracy and less current ripple. This transition between the PWM and linear modes generally induces an offset (e.g., steady-state or transition offset), overshoot or undershoot, a steady-state error, or a transient error (e.g., an error in the delta current). In some circumstances, this offset is affected by one or more factors, such as, but not limited to, slew rate of the rise/fall of PWM square wave voltage and frequency of the PWM square wave that produces the effective current to the VCM motor, current level (e.g., of the VCM current), and/or direction (e.g., towards the inner diameter or ID, towards the outer diameter or OD of the disk). As noted above, currently used techniques attempt to pick an "optimum" PWM frequency and slew rate combination that minimizes the offset between the PWM and linear modes. In some circumstances, if the offset is still too high (exceeds a pre-defined threshold), the VCM may be operated for a longer time in the linear mode before the actuator arm assembly finally seeks over the target track. While this allows the servo controller more time to compensate for the position error signal (PES) and reduce the error, such a design is not without its drawbacks, namely, extra power consumption due to the longer time spent in the linear mode during the seek operation.

Aspects of the present disclosure are directed to a refined hardware/firmware (HW/FW) interaction technique for reducing or minimizing the offset between the PWM and linear modes. This may serve to (1) optimize the PES or random transient vibrations (RTV) by reducing the offset between PWM and linear (or current control loop (CCL)) modes, (2) reduce the time in linear mode and/or the time spent in a higher power PWM setting, (3) reduce power consumption during seeking due to the reduced time in linear mode and/or the reduced time spent in the higher power PWM setting, and/or (4) allow more flexibility for VCM PWM frequency and/or slew rate settings.

Figure 2C:
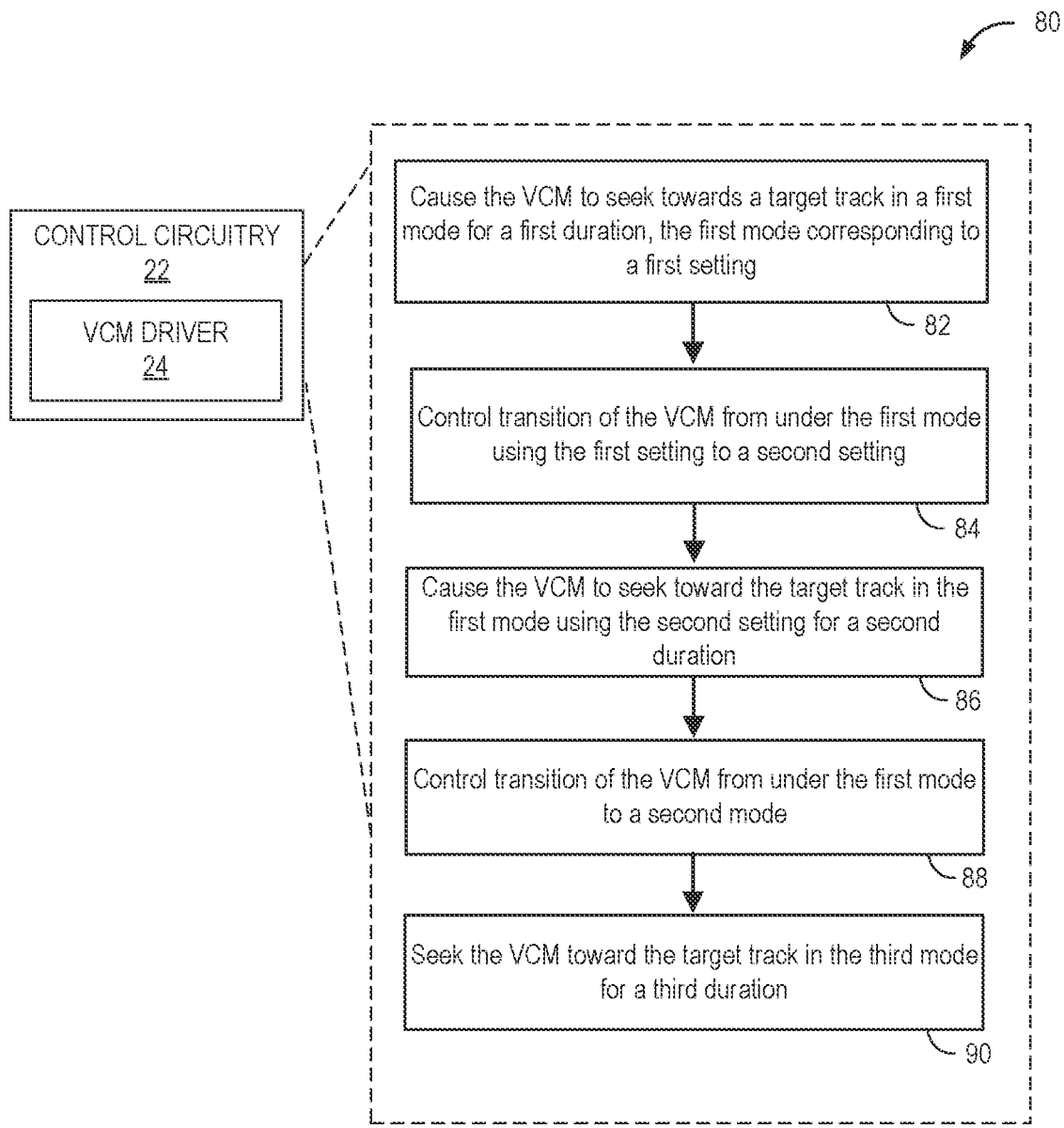
FIG. 2C illustrates a method that a data storage device may perform, execute, and implement, in accordance with aspects of the present disclosure.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16.

Actuator assembly 19 comprises a primary actuator 20 (e.g., a voice coil motor or VCM, also shown as VCM 925 in FIG. 9) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example. In some examples, the data storage device or disk drive 15 may be an example of a dual actuator drive and may comprise a second VCM (not shown) in addition to the first VCM (i.e., primary actuator 20). As described in further detail below, the motion of the first VCM (seeking actuator) may induce a cPES in the second VCM (non-seeking actuator). Aspects of the disclosure are directed to reducing/minimizing the cPES in the non-seeking actuator as the seeking actuator is seeking towards a target track. In one non-limiting example, during the PWM mode, the seeking actuator may utilize a higher slew rate-lower frequency combination for a first duration followed by a lower slew rate-higher frequency combination for a second duration, i.e., before switching to the CCL mode, which serves to reduce the cPES induced in the second VCM, as compared to the prior art.

FIG. 2A also depicts servo sectors 32 (e.g., servo sectors 32, through 32N) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

In some examples, the control circuitry 22 is configured to control the actuation of the primary actuator (i.e., VCM 20). Further, the VCM 20 is configured to actuate the head 18 over the disk surfaces 17. In some embodiments, the VCM 20 is configured to operate in a plurality of modes, for instance, a first mode and a second mode. In some cases, each of the first and second modes comprises one of a pulse width modulation (PWM) mode and a linear or current control loop (CCL) mode. In some cases, a plurality of setting values (e.g., pairs of settling values, each pair comprising a PWM frequency and a slew rate) may be used while operating the VCM in the PWM mode. In some cases, a first pair of setting values may be used for a first duration and a second pair of setting values may be used for a second duration while the VCM is operating in the PWM mode, where the second duration is after the first duration. In some cases, the first pair of setting values may be different from the second pair of setting values and may utilize a different PWM frequency and/or slew rate. In one non-limiting example, the PWM mode utilizes a first pair of setting values (e.g., PWM frequency: 210 kHz, slew rate: 50V/µs) for a first duration and a second pair of setting values (e.g., PWM frequency: 90 kHz, slew rate: 200V/µs) for a second duration, where the second pair of settling values are applied after the first pair of setting values. In some other cases, only one of the parameters or setting values (e.g., PWM frequency or slew rate) of the first pair is different from the second pair. For instance, the first pair of settling values may comprise a first PWM frequency (e.g., 210 kHz) and a first slew rate (e.g., 50V/µs), while the second pair of setting values may comprise the first PWM frequency (e.g., 210 kHz) and a second slew rate (e.g., 200V/µs).

As seen in FIG. 2C, the control circuitry 22 is also configured to cause the VCM to seek towards a target track in the first mode using the first setting (e.g., first PWM frequency-slew rate combination) for a first duration (82), control transition of the VCM from under the first mode using the first setting to the second setting (e.g., second PWM frequency-slew rate combination) (84), cause the VCM to seek towards the target track in the first mode using the second setting for a second duration (86), control transition of the VCM from under the first mode to a second mode (88), wherein controlling the transitioning to the second mode comprises seeking the VCM toward the target track in the second mode for a third duration (90). In some examples, transitioning the VCM from using the first setting to the second setting for the first mode (e.g., PWM mode) comprises changing, at or near an end of the first duration, at least one parameter/setting value of the first setting (84).

In some cases, the second setting is based at least in part on changing the at least one parameter (e.g., PWM frequency, slew rate) of the first setting.

In some embodiments, the control circuitry 22 provides a PWM control signal to digital transistor switches providing an idle current to the VCM. In one non-limiting example, the PWM modulation circuit includes a plurality of digital transistor switches which provide current in a single direction through the VCM. A sense resistor (shown as $R_s$ in FIG. 9) provides a sensed voltage proportional to the current through the VCM. This sensed voltage is amplified by an amplifier, herein referred to as a current sense amplifier (CSA), shown as CSA 940 in FIG. 9. In some examples, a comparator circuit provides a comparator output when said amplified voltage exceeds a predetermined value. A delay circuit may be used to activate the transistor switches and turn off a transistor switch in response to the comparator indicating a peak value has been reached. The delay circuitry may also simultaneously start a delay timer, which keeps the switch off for a predetermined time delay until the control current has decayed to the lowest desired value.

Figure 7:
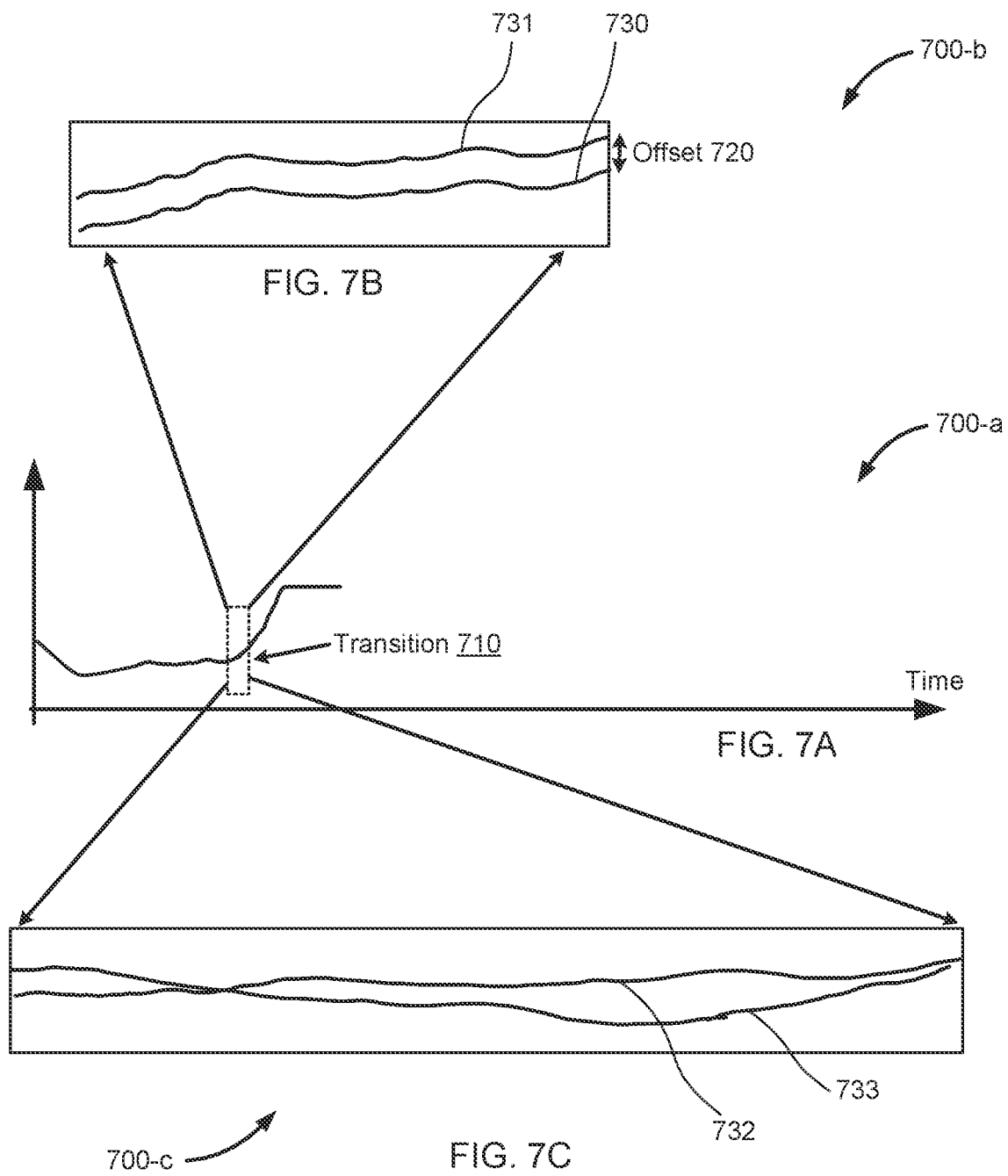
FIGS. 7A-7C depict conceptual graphs of VCM waveforms measured during a transition from a PWM mode to a linear mode in the prior art, where the PWM mode utilizes a single VCM PWM frequency and slew rate setting.

It should be noted that, other techniques for generating a PWM drive voltage are contemplated in different embodiments. For example, the control circuitry 22 or the VCM driver 24 may form a drive current command (e.g., VCM control signal 38 in FIG. 2A, drive command 908 in FIG. 9 from the SoC which is part of the control circuitry 22) for actuating the VCM based on the position error signal or PES. This drive current command may be converted into an analog signal (shown as V DAC in FIG. 9) by a digital/analog conversion circuit (DAC). In some cases, an output side amplifier (e.g., in the control circuitry 22 or the VCM driver 24) forms a drive voltage having a slew rate (e.g., 50 V/us, 200 V/us, etc.), where the drive voltage is used to drive the VCM. A switch may be used to toggle/transition between the linear and PWM modes. In the linear mode, the drive voltage may be used to directly drive the VCM. Further, in the PWM mode, the drive voltage may be converted into a pulse signal (e.g., by a linear PWM modulation circuit) and input to the VCM. In some cases, the actual measured current ($I_{SENSE}$ or $I_S$ 906 in FIG. 9) may be converted into a voltage signal by a sense resistor ($R_s$), where the voltage signal is amplified by the CSA and used as a feedback signal (e.g., for the amplifier forming the drive voltage). Further, the CSA output voltage (i.e., corresponding to the actual measured current) is subtracted from the commanded DAC voltage to determine an error signal. In some examples, this error is amplified (e.g., with a certain desired bode response) and the power driver (e.g., power driver 902 in FIG. 9) is used to drive that error signal. As a result, the drive voltage causes a drive current proportional to the analog signal to flow through the VCM. In some circumstances, an output offset (e.g., shown in FIG. 7B) with respect to the drive current may occur between the PWM and the linear mode, which may lead to current oscillations/fluctuations during the transition between the two modes. In some cases, this output offset is a steady-state offset between the PWM and CCL modes.

As noted above, the VCM driver 24 is primarily in PWM mode during a seek to a target track, which serves to enhance power efficiency. However, as the disk head approaches the target track, the control circuitry 22 is configured to switch the VCM driver 24 to linear mode. While the linear mode utilizes more power than the PWM mode, the linear mode provides better accuracy and less current ripple, thus reducing the PES. Some aspects of the present disclosure are directed to enhancing accuracy (i.e., reducing PES, such as a track arrival PES) at the end of the seek operation, while simultaneously reducing the time spent in the linear mode. Currently used techniques use a single VCM PWM setting that has a low PWM-linear mode offset in order to improve seek settling (e.g., RTV) performance. In accordance with aspects of the present disclosure, multiple different PWM frequency-slew rate settings may be utilized during a seek to not only improve seek settling or RTV performance, but also optimize power consumption, as compared to the prior art. In one non-limiting example, during most of the duration in which the VCM is operating in the PWM mode, a first PWM setting (e.g., lower frequency, higher slew rate) may be utilized to conserve power. Furthermore, towards the end of the seek operation, a different PWM setting having better RTV performance may be utilized, for instance, by changing one or more of the parameters (e.g., PWM frequency, slew rate) of the first setting. The VCM is then operated in the first mode (e.g., PWM mode) using the second PWM setting for a second duration before the mode of operation is changed to the linear mode.

In some embodiments, the control circuitry 22 is also configured to determine the time (i.e., PWM change time) at which the VCM switches from the first setting (i.e., first pairs of setting values or first PWM frequency-slew rate combination) to the second setting (i.e., second PWM frequency-slew rate combination). In some cases, the first pair of setting values (or first frequency-slew rate combination) may be selected to facilitate lower power consumption, while the second frequency-slew rate combination may be selected to optimize RTV. In some circumstances, if the second PWM setting is not applied to the VCM for a sufficient duration of time, the RTV may increase/worsen if the first frequency-slew rate has a worse RTV impact than the second frequency-slew rate. In some aspects, determining an optimal PWM change time helps ensure that the second PWM setting is applied for a sufficient duration of time that allows the servo system to compensate for the error difference (if any) before the mode of operation is switched to the linear or CCL mode. As can be appreciated, by determining an optimal time at which the VCM should change from the first PWM setting to the second PWM setting, aspects of the present disclosure facilitate in reducing the power consumption and optimizing PES (or RTV) during seek operations. In some circumstances, the present disclosure may serve to reduce the power consumption (e.g., at least 100 mW, at least 200 mW, at least 500 mW, etc.) per seek operation, as compared to the prior art. This facilitates in reducing the power draw of the disk drive from the host system, reducing battery size and/or enhancing battery life for devices, to name a few non-limiting examples.

In the embodiment of FIG. 2A, the control circuitry 22 may comprise a VCM driver 24 (also referred to as a VCM power driver 24). The VCM power driver 24 may implement one or more aspects of the power driver 902 described in relation to FIG. 9. Further, the control circuitry 22 may process a read signal emanating from the head 18 to demodulate servo data written on the disk (e.g., servo sectors 32) to generate a position error signal (PES) representing an error between the actual position of the head and a target position relative to a target track. The control circuitry 22 may process the PES using a suitable servo control system to generate the VCM control signal 38 applied to the VCM 20 which rotates an actuator arm 40 about a pivot in order to actuate the head 18 radially over the disk surface 17 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 40.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the back electromotive force (BEMF) voltage generated by the VCM 20 during a calibration seek (where the BEMF voltage represents an estimated velocity of the VCM). The bootstrap spiral track is then written to the disk using the feed-forward compensation.

Figure 9:
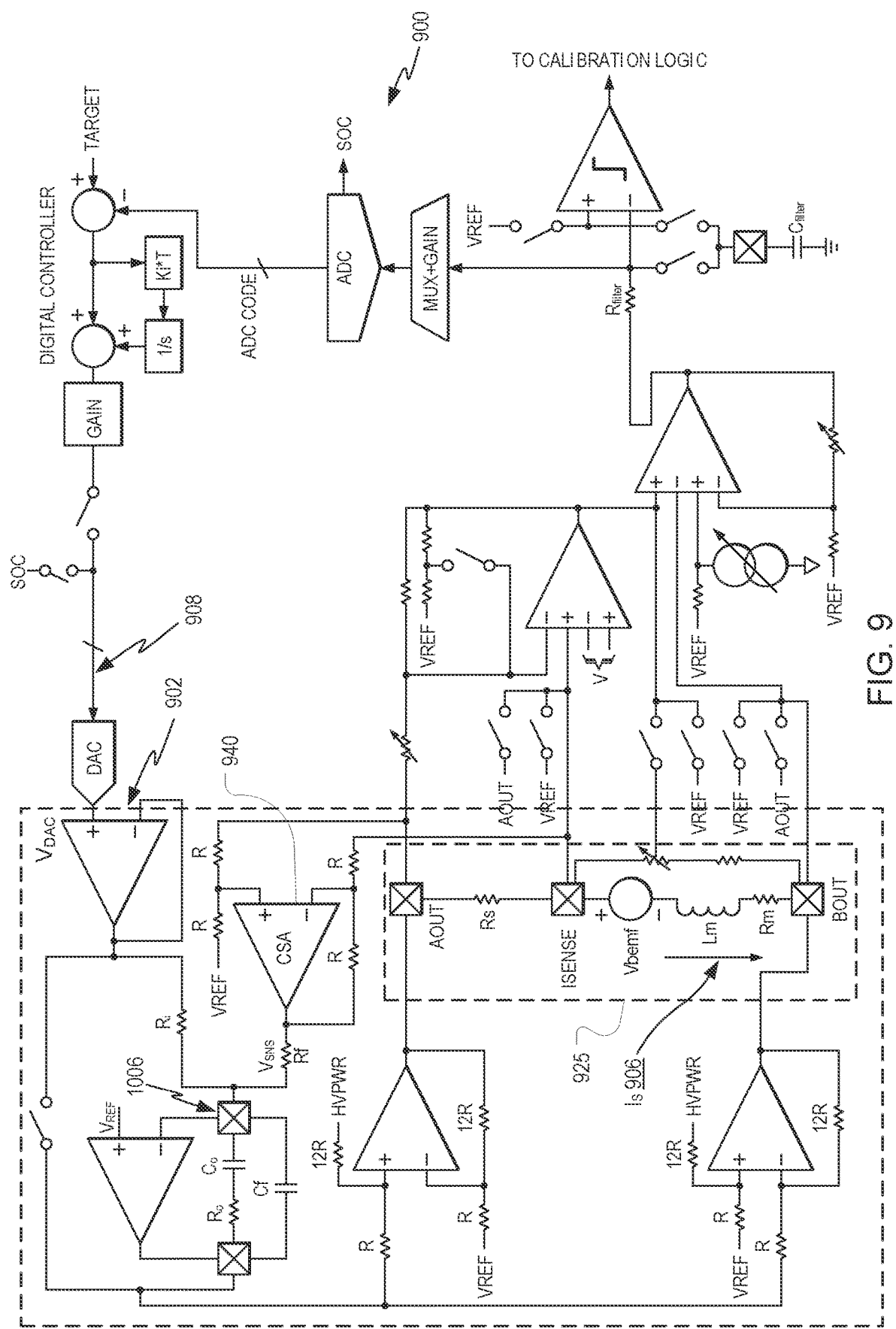
FIG. 9 illustrates a schematic diagram of a VCM and a power driver circuit of a data storage device, such as a disk drive, in accordance with aspects of the present disclosure.

Turning now to FIG. 9, which illustrates a schematic diagram 900 of a Voice Control Motor (VCM) driver circuit 902 of a data storage device, such as a disk drive, in accordance with aspects of the present disclosure. In some cases, voice coil actuators work on the principle of a permanent magnetic field and a coil winding. When a current is applied to the VCM coil, a force is generated. This force, known as the Lorentz force, is directly proportional to the input current. By controlling the amount of current applied to the motor, accurate motor positioning may be achieved. In some examples, the current applied to the VCM may be controlled using a current control loop (CCL). In CCL, a sense resistor ($R_s$) is placed in series to the VCM and the voltage across that sense resistor is sensed. In FIG. 9, 925 represents an example representation of the VCM circuitry, where current 906 corresponds to the current flowing through the windings of the VCM. As seen, the VCM driver circuit 902 is connected to a digital to analog converter (DAC) that outputs a DAC voltage ($V_{DAC}$). The VCM driver circuit 902 further comprises a current sense amplifier (CSA) 940 having a gain ($G_s$) that amplifies the voltage across the sense resistor ($R_s$), where the amplified voltage is shown as $V_{SNS}$. Specifically, the sensed current ($I_{SENSE}$ or $I_s$ 906) flowing through the VCM 925 is converted into a voltage signal using the sense resistor ($R_s$) and amplified by the CSA 940. In this example, $V_{DAC}/R_i = V_{SNS}/R_f$, where $V_{SNS} = G_s \times R_s \times I_s$, and $G_s$=gain of CSA 940. Thus, the sensed current 906 can be calculated as: $I_s = V_{DAC} \times (R_f/(G_s \times R_s \times R_i))$.

Figure 3:
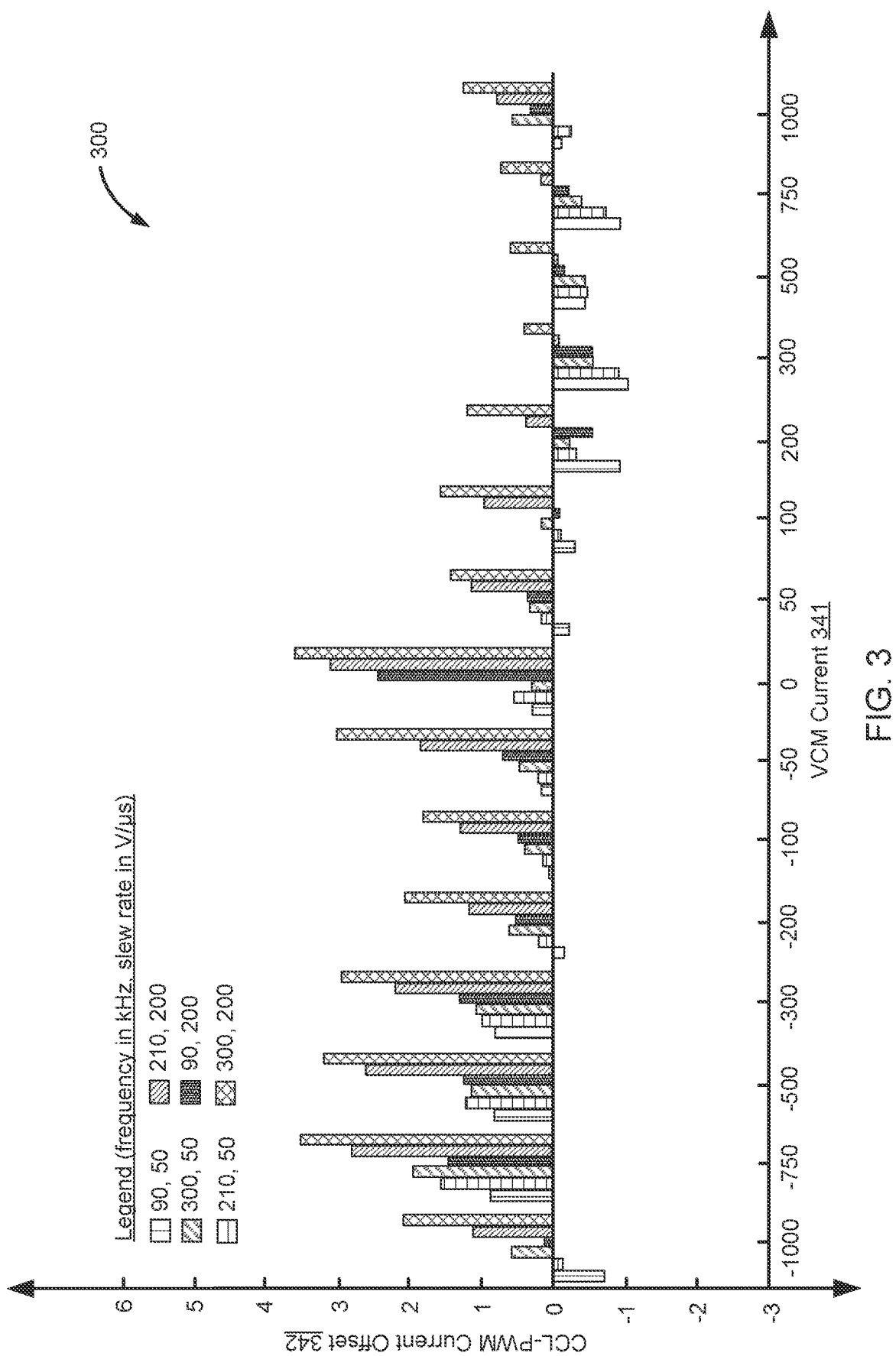
FIG. 3 illustrates an example graph of transition offsets against VCM current for different PWM frequency and slew rate combinations, according to various aspects of the disclosure.

FIG. 3 illustrates an example graph 300 of CCL-PWM current offset 342 (e.g., steady-state offset between PWM and CCL modes) against VCM current 341 for different PWM mode settings (or different PWM frequency-slew rate combinations), according to various aspects of the disclosure. As described above, an offset (e.g., a transition or steady-state offset) is created between the linear mode and the PWM mode when the same VCM current is supplied to the VCM. In some circumstances, a transient current fluctuation may also be generated during the transition between the two modes, for example, by a voltage corresponding to the current offset at the output stage of the VCM driver.

In some cases, the CCL-PWM current offset is based on a multitude of factors. For example, the CCL-PWM current offset is based on one or more of (1) the VCM current level, (2) time spent in linear mode, and (3) PWM frequency and slew rate combination. As seen in graph 300, the offset 342 shown on the vertical or y-axis varies based on the VCM current applied. Graph 300 also depicts the relation of the offset for each VCM current level (e.g., −1000 mA, −200 mA, 100 mA, 200 mA, etc.) applied with respect to different PWM frequency and slew rate combinations. Specifically, the different bar graphs for each VCM current level correspond to different PWM frequency and slew rate combinations. In this example, the PWM frequency and slew rates are in units of kHz and V/ps, respectively. As seen, the CCL-PWM current offset at the same VCM current 341 level varies for different PWM frequency and slew rate combinations (e.g., 90 kHz, 50 V/μs; 90 kHz, 200 V/μs; 210 kHz, 200 V/μs, etc.). As noted above, the servo loop has to compensate for this steady state offset between the PWM mode and the CCL mode while switching back to the CCL mode as the VCM arrives at the target track. If the steady state offset (i.e., corresponding to the VCM current level and PWM frequency-slew rate combination) is higher, it may result in worse PES and RTV. As seen in FIG. 3, higher slew rates and higher PWM frequencies generally lead to higher PWM-CCL offsets.

Thus, the various aspects of the different PWM setting parameters (i.e., slew rate, PWM frequency) can be summarized as follows: higher slew rates generally allow for better power and/or better coupled PES (cPES) as a result of reducing the abnormal duty cycle, but worse RTV due to the higher PWM-CCL offset, and lower PWM frequencies generally allow for better cPES as a result of reducing the abnormal duty cycle, and better power consumption.

In some embodiments, for instance, for a HDD using dual actuators, another factor may need to be considered, namely the coupled PES (cPES). In some circumstances, cPES may be induced due to the coupling between a seeking actuator and a non-seeking actuator. For example, the seeking actuator's motion may couple into the non-seeking actuator, resulting in the cPES. The coupled PES may be measured for the remote actuator. For instance, the remote actuator (or non-seeking actuator) may be configured to follow a track as the other actuator (i.e., seeking actuator) is seeking and the control circuitry 22 may measure the track following PES for the non-seeking actuator. That is, the control circuitry 22 is configured to measure the remote PES for the non-seeking actuator as the other actuator is seeking. In some cases, the cPES is calculated from subtracting the new PES (i.e., measured PES for the non-seeking actuator while the other actuator is seeking) from a baseline PES for the remote actuator, where the baseline PES corresponds to the remote actuator's PES when the other actuator is not seeking. As such, the cPES corresponds to the PES induced on the remote/non-seeking actuator as a result of the seeking actuator.

In some cases, aspects of the disclosure are directed to determining optimal slew rate and frequency combinations for use in the PWM mode, which may serve to reduce the cPES. In some circumstances, the cPES is based on the level of abnormal duty cycle. By reducing the level of abnormal duty cycle when the VCM is operating in the PWM mode, the cPES can be enhanced (i.e., made lower). As noted below, a higher VCM PWM slew rate and lower VCM PWM frequency may allow for a lower VCM PWM abnormal duty cycle (i.e., better cPES). That is, HDD performance can be optimized by using a combination of a higher PWM slew rate and lower PWM frequency. In some circumstances, the abnormal PWM duty cycle error, which is one metric used for gauging VCM PWM performance, may be optimized by using a lower PWM frequency (e.g., 90 kHz, instead of 210 kHz) and higher slew rate (e.g., 200V/μs, instead of 50V/μs).

Figure 4:
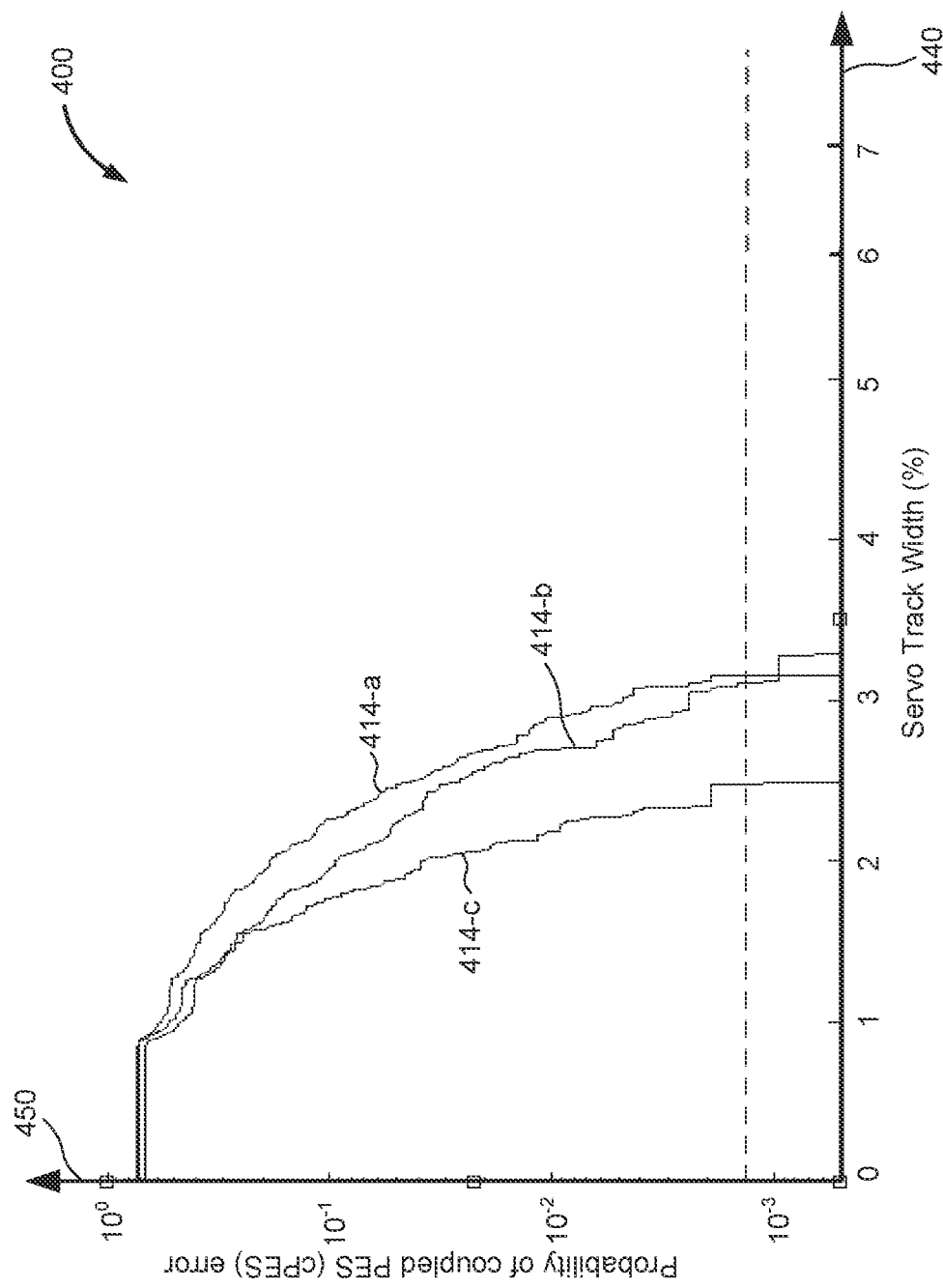
FIG. 4 illustrates a conceptual graph of probability against positioning error, where the positioning error is shown in terms of percentage of servo track, for different PWM frequency and slew rate settings, according to various aspects of the disclosure.

FIG. 4 illustrates a conceptual graph 400 showing the probability of induced or coupled positioning error (on the vertical or y-axis 450) against percentage of servo track width (on the horizontal or x-axis 440) for different PWM frequency and slew rate settings, according to various aspects of the disclosure. In some aspects, graph 400 depicts the coupled PES or cPES for different PWM frequency-slew rate combinations prior to switching to the CCL mode, in accordance with one or more implementations. As seen, graph 400 comprises three curves 414-*a*, 414-*b*, and 414-*c*, corresponding to different PWM settings (or frequency-slew rate combinations). Here, curve 414-*a* corresponds to a cPES curve for a PWM mode operation, where the PWM mode operation utilizes a first PWM setting (e.g., 210 kHz-200V/μs) for a first duration and a second PWM setting (e.g., 210 kHz-50V/μs) for a second duration prior to switching to the CCL mode. Further, curve 414-*b* corresponds to a cPES curve for a PWM mode operation, where the PWM mode operation utilizes a single PWM setting (e.g., 210 kHz-50V/μs) prior to switching to the CCL mode. Lastly, curve 414-*c* corresponds to a cPES curve for a PWM mode operation, where the PWM mode operation utilizes a third PWM setting (e.g., 90 kHz-200V/μs) for a first duration and a fourth PWM setting (e.g., 210 kHz-50V/μs) for a second duration prior to switching to the CCL mode. Similar to curve 414-*a*, the VCM is operated with a 90 kHz PWM frequency and 200V/μs slew rate for most of the seek operation, following which it is switched to a 210 kHz-50V/μs frequency-slew rate combination towards the end of the seek. The VCM is then operated in the CCL mode (i.e., for a short duration) before it arrives at the target track.

In graph 400, a smaller (or lower) intercept on the x-axis (percentage of servo track width) implies better performance. For example, the third curve 414-*c* has better performance since the probability of cPES error drops off more steeply (i.e., than curves 414-*a* and 414-*b*) as the servo track width (%) increases. As seen, in this example, the third curve 414-*c* corresponding to the low frequency-high slew rate combination followed by the high frequency-low slew rate combination provides the most optimal cPES, where the cPES corresponds to the PES induced on the remote/non-seeking actuator due to the seeking actuator. That is, the optimized setting of VCM PWM 90 kHz-200V/μs to 210 kHz-50V/μs serves to improve the cPES (e.g., for an HDD using dual actuators) as compared to using a single PWM setting (e.g., 210 kHz-50V/μs) in the prior art, or a high frequency-high slew rate to high-frequency-low slew rate setting.

Figure 5:
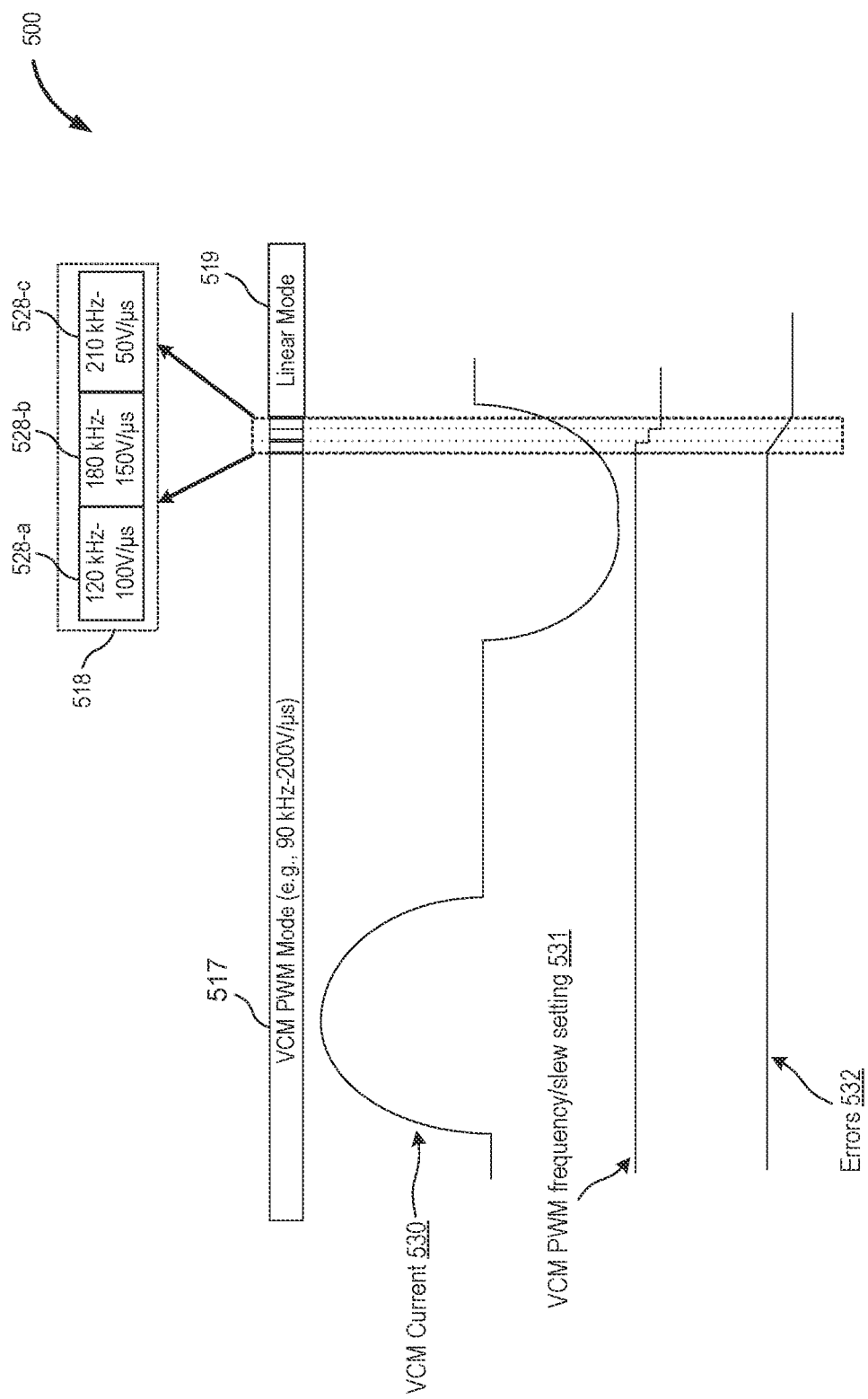
FIG. 5 illustrates an example of an implementation where multiple pairs of VCM PWM frequency and slew rate values are utilized while the VCM is operating in the PWM mode, according to various aspects of the disclosure.

FIG. 5 illustrates an example of an implementation (500) where multiple VCM PWM frequency and slew rate settings are utilized while transitioning from a PWM mode to a linear mode, according to various aspects of the disclosure. In some cases, multiple pairs of setting values (e.g., VCM PWM frequency-slew rate combinations) may be utilized while the VCM is operating in the PWM mode. For example, 2, 4, 8, etc., frequency-slew rate combinations may be utilized, which serves to minimize (or smooth) the transitions between different PWM frequency-slew rate combinations and create a more linear change in the VCM current. This helps reduce sharp VCM current impulses into the actuator system. Additionally, or alternatively, the linear change in the VCM current also enhances power savings, for instance, by allowing the VCM to operate using a more power efficient frequency-slew rate combination for a longer duration.

As seen, FIG. 5 depicts a VCM operating in a first mode (e.g., PWM mode 517 utilizing a first frequency-slew rate combination) for a first duration. Graph 500 also depicts the VCM current 530 measured during this first duration/portion of the seek operation, the VCM PWM frequency/slew setting 531 (e.g., 90 kHz-200V/μs, 120 kHz-100V/μs, 180 kHz-150V/μs, 210 kHz-50V/μs) as a function of time, and the errors 532 that contribute to PES/RTV upon arrival at the target track. In some aspects, the errors 532 correspond to the PWM-CCL offset error, described in further detail below. The errors 532 shown in FIG. 5 comprise an estimated PWM-CCL offset error for a particular frequency-slew rate combination, for instance, if the VCM is switched from the PWM mode to the linear mode using that frequency-slew rate combination. As seen, the estimated error is higher for the first 90 kHz-200V/μs combination as compared to the last 210 kHz-50V/μs combination. However, since it is the beginning of the seek (i.e., VCM is not close to the target track), this increased error due to the first frequency-slew rate combination is of lower concern than the higher power consumption due to the second, third, and/or fourth frequency-slew rate combinations. In other words, the higher error associated with the first frequency-slew rate combination can be adjusted for towards the end of the seek operation by switching to one or more other frequency-slew rate combinations that provide better cPES (e.g., for a non-seeking actuator if the HDD utilizes dual actuators), lower offset error, better track arrival PES, or a combination thereof.

In this example, the VCM operates in the PWM mode using a first PWM setting (e.g., for a majority of the seek operation, as this lower frequency-higher slew rate combination facilitates lower power consumption. In some embodiments, one or more parameters of the first PWM setting are changed between the PWM mode 517 and the linear mode 519, shown by 518. Specifically, three different PWM frequency-slew rate settings 528-*a*, 528-*b*, and 528-*c* are utilized in the transition (518) between the PWM mode 517 and linear mode 519. In some cases, the control circuitry 22 operates the VCM using the second PWM setting 528-*a* (e.g., 120 kHz-100V/μs), the third PWM setting 528-*b* (e.g., 180 kHz-150V/μs), and the fourth PWM setting 528-*c* (e.g., 210 kHz-50V/μs) for the same or a different amount of time. In some embodiments, the first PWM setting (e.g., 90 kHz-200V/μs) is applied to the VCM for a significantly longer duration than the three other PWM settings (e.g., individually or in combination). Towards the end of the seek operation, the VCM switches from operating in the PWM mode using the fourth PWM setting 528-*c* to the linear mode 519. In this example, the VCM PWM/slew setting 531 is selected to be 90 kHz-200V/μs for the majority of the seek operation, since it serves to reduce power consumption without significantly affecting seek performance such as cPES results. By gradually changing the VCM PWM/slew setting 531 (i.e., from the first PWM setting to the second to the third and so on) towards the end of the seek operation and before switching to the linear mode, it allows for further optimization of both seek performance such as cPES and energy use.

FIG. 5 also depicts the errors 532 as a function of time, where the errors 532 contribute to the PES (or RTV) upon arrival at the target track. In some examples, the error 532 corresponds to the PWM-CCL offset error. As seen, the error is steady (or substantially steady) when the frequency-slew rate combination is unchanged. At the end of the first duration (i.e., end of 517), where the PWM setting is changed from the first to the second PWM setting, there is a reduction in the errors. Here, there is a relatively consistent reduction seen in the errors 532 (e.g., PWM-CCL offset error) as the VCM switches from the first to the second, second to the third, and so on, PWM mode settings.

In some examples, different PWM frequency-slew rate combinations may be implemented by way of a plurality of PWM-slew switches, e.g., 1-switch for each frequency-slew rate combination. It should be noted that, other techniques may be utilized for switching between different PWM settings and the examples listed herein are not intended to be limiting.

Some aspects of the present disclosure are directed to optimizing the VCM PWM frequency-slew rate settings and/or determining an optimal change time for switching between different PWM settings (i.e., switching from a first PWM setting to a second PWM setting).

In some embodiments, aspects of the present disclosure may be implemented in firmware (FW). For example, the FW may utilize a tuning method to optimize the PES as the disk head arrives at the target track during a seek, while also optimizing power consumption by operating the seek in a lower power PWM mode for a longer duration, as compared to the prior art. In some examples, the FW may utilize a calibration routine, where the calibration routine results in a lookup table/function, or another data structure, of different tunings recorded for different seek lengths (e.g., seek duration, seek distance), heads, and/or directions (e.g., from inner diameter or ID to outer diameter or OD, from OD to ID). In some aspects, utilizing different seek lengths (i.e., as opposed to a single static seek length) may help account for the variation in bias current to hold the VCM in place at different locations on the disk surface. In some cases, the calibration routine may comprise an initial calibration phase, where a binary search is used to sweep through different PWM change times (e.g., time at which the VCM PWM setting is changed from a first setting corresponding to lower power consumption to a second setting corresponding to lower PES/RTV) for two or more PWM settings. In some cases, the control circuitry 22 controls the VCM to perform a plurality of seeks and monitors the PES measured during these seeks to identify an optimal PWM change time at which it should switch between the different PWM settings. In some examples, this process may be repeated for different PWM frequency-slew rate combinations and/or different seek lengths to determine an optimal PWM change time for different combinations of PWM frequencies, slew rates, seek lengths, and/or seek directions (e.g., ID to OD, OD to ID).

In some embodiments, the control circuitry 22 (or FW) is configured to employ a calibration phase during HDD manufacturing or upon power up of an HDD in which seeks are performed. In some cases, the control circuitry 22 decrements the PWM frequency-slew rate change time and monitors the corresponding PES, as further described below in relation to FIG. 6.

Figure 6:
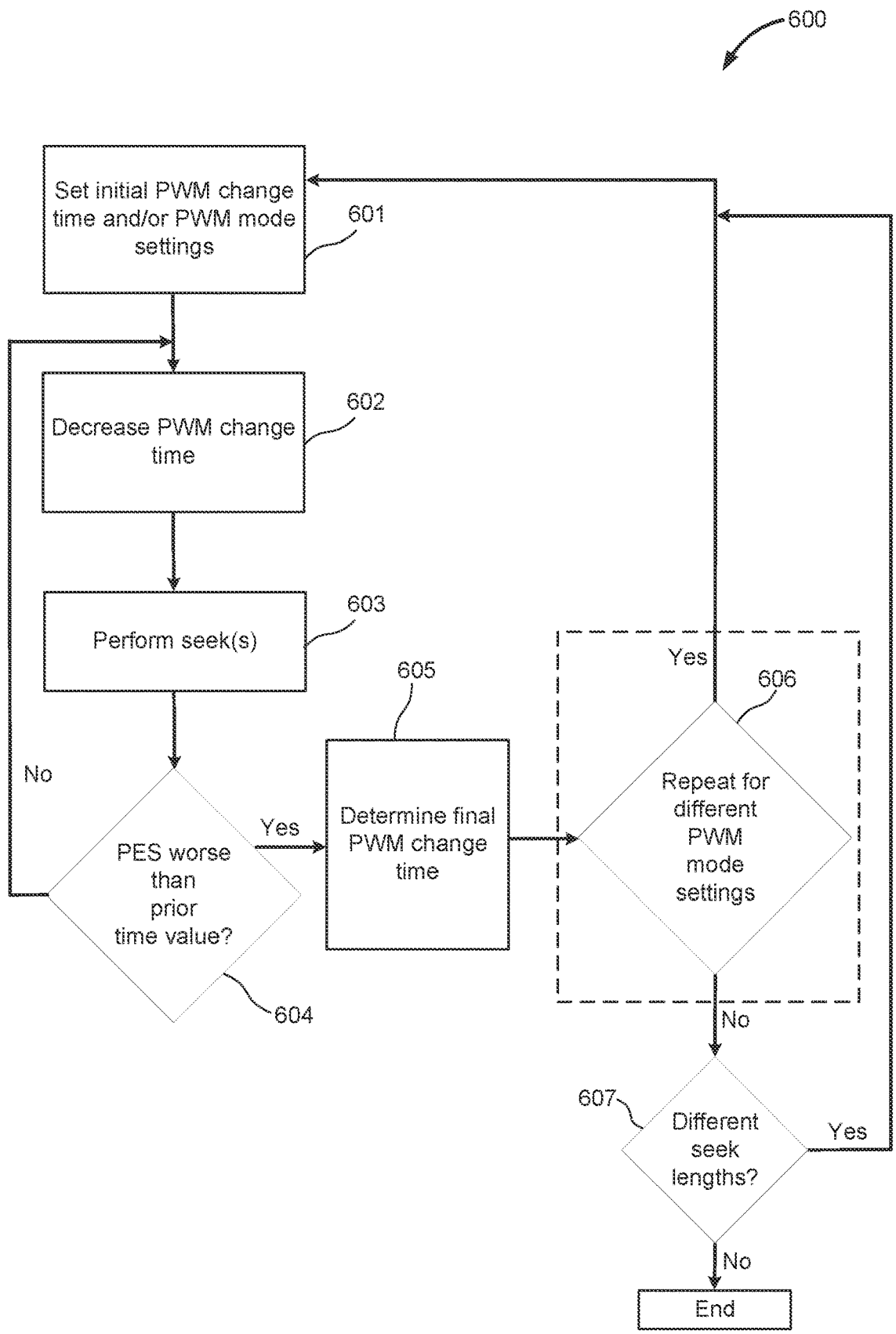
FIG. 6 illustrates an example of a method for determining an optimal PWM change time for switching between different VCM PWM frequency and slew rate settings, according to various aspects of the disclosure.

FIG. 6 illustrates an example of a method 600 for determining an optimal change time for changing between different PWM settings, according to various aspects of the disclosure. The method 600 may be implemented by the control circuitry 22, or alternatively, the VCM driver 24. In other cases, the method 600 may be implemented in the FW. Further, the method 600 implements one or more aspects of the calibration routine described above and elsewhere throughout the disclosure.

At step 601, the method comprises setting an initial change time and/or setting initial PWM mode settings (e.g., a first PWM setting corresponding to a first PWM frequency-slew rate combination and a second PWM setting corresponding to a second PWM frequency-slew rate combination). In some cases, the initial change time corresponds to a time at which the VCM changes from operating using the first PWM setting to the second, different PWM setting.

In some aspects, the change time corresponds to the time for which the VCM is operated using the first PWM setting or the second PWM setting. Additionally, or alternatively, the PWM change time may also correspond to the time at which the VCM changes from the PWM mode to the linear or CCL mode. In such cases, there is a first change PWM change time (e.g., time at which VCM changes from the first to the second PWM mode setting) and a second PWM change time (e.g., time at which VCM changes from the second PWM mode setting to the linear or CCL mode). In some examples, multiple PWM change times may be determined, for instance, if multiple PWM mode settings (e.g., 3 or 4, such as in FIG. 5) are utilized during the PWM mode of the seek operation. While not necessary, in some cases, one or more of the PWM change times may be the same. For example, in FIG. 5, the same PWM change time (e.g., 100 μs) may be utilized for one or more of the second, third, and fourth PWM settings 528-a, 528-b, and 528-c.

At step 602, the method 600 comprises decreasing the PWM change time (e.g., by an interval amount, such as 50 μs, 100 μs, 150 μs, etc.). Further, at step 603, the method comprises performing seeks for different PWM change times and monitoring the corresponding track arrival PES. That is, during the calibration phase, the FW or the control circuitry 22 is configured to incrementally reduce the PWM change time (e.g., to reduce the duration for which the VCM operates using the higher power PWM setting) and monitor the track arrival PES to determine an optimal PWM change time, which helps reduce power consumption during seek operations. In some cases, the control circuitry 22 also determines an optimal time at which the VCM switches from the PWM mode (e.g., using the higher power PWM setting) to the linear or CCL mode. In this way, the present disclosure not only helps reduce the time spent in linear mode, but also the time spent in a higher power PWM setting, while also optimizing the track arrival PES.

At step 604, the control circuitry 22, or the servo control system, determines whether the PES (i.e., for the new PWM change time) is worse than the PES for the prior PWM change time. If yes, at step 605, the method 600 comprises determining a final PWM change time and PWM mode settings to minimize power consumption and the PWM-linear mode transition offset (e.g., a steady-state offset between the two modes). That is, at step 605, the control circuitry 22 (or the FW) determines the PWM change time and settings combination corresponding to the lowest PES. If no, the method 600 returns to step 602 and continues until an optimum PWM change time is determined (i.e., when the decision at step 604 is Yes) for the selected PWM mode settings.

As previously noted in relation to FIG. 3, the PWM-CCL offset varies for different PWM frequencies and slew rates. At step 606 (optional), the method comprises repeating steps 601-605 for different PWM mode settings (e.g., different PWM frequency-slew rate combinations).

In some circumstances, the bias current used to hold the VCM in place over a certain location on the disk surface may vary for different seek lengths or directions. As previously noted, the bias current to hold the VCM in place over a certain location on the disk surface may vary at different locations (e.g., for different seek lengths). At step 607 (optional), the method 600 comprises repeating steps 601-606 for different seek lengths, which allows for a finer optimization for each seek length. Depending on the seek length, there may be a shorter or longer amount of time during which the VCM operates in the PWM mode or operates using a higher power PWM setting. For instance, during a short seek, the PWM mode may only be turned on for a brief duration before switching to the linear or CCL mode. As such, the control circuitry 22 may determine a more optimal PWM setting (e.g., frequency-slew rate combination and/or PWM change time) for short seeks (e.g., seeks having a length that is less than a pre-defined threshold). In some other cases, the control circuitry 22 is configured to monitor the HDD use cases and specifically optimize to the dominant seek lengths (e.g., most commonly encountered seek lengths) for a particular customer or user.

Thus, aspects of the disclosure support compensation of a wide variety of transient and steady-state offsets created during normal operations (e.g., seeking) of a disk drive, with less power usage than in the prior art.

FIGS. 7A-7C depict conceptual graphs 700 of VCM waveforms during a transition from PWM mode to linear mode in the prior art. Graph 700-a depicts the VCM current against time for two different VCM PWM frequency/slew combinations. For example, some implementations use a 210 kHz PWM frequency and a 50 V/μs slew rate for the VCM PWM mode. Ideally, a higher slew rate (e.g., 200 V/μs) may help reduce power consumption. However, a higher slew rate leads to a larger transition/steady-state offset between the two modes, which needs to be compensated for to reduce the PES or random transient vibrations (RTV). Accordingly, to reduce PES, currently used techniques utilize a lower slew rate (e.g., 50 V/μs) while operating the VCM in the PWM mode. This adversely impacts the power efficiency of the HDD. As seen, FIG. 7B depicts a zoomed-in view of the transition 710 in FIG. 7A, including a first/baseline VCM current waveform 730 (e.g., for a 210 kHz PWM frequency and a V/ps slew rate) and a second VCM current waveform 731 (e.g., for a 210 kHz PWM frequency and a 200 V/μs slew rate). FIG. 7B also depicts the offset 720 between the baseline vs the higher slew rate plot. In some circumstances, this offset 720 results in an oscillation in the VCM current as the servo control loop tries to correct the offset. For example, FIG. 7C depicts averaged VCM current waveforms for both the baseline (shown as 732) and the higher slew rate (shown as 733). As seen, there is more oscillation when a higher slew rate is used as compared to the baseline.

Figure 8:
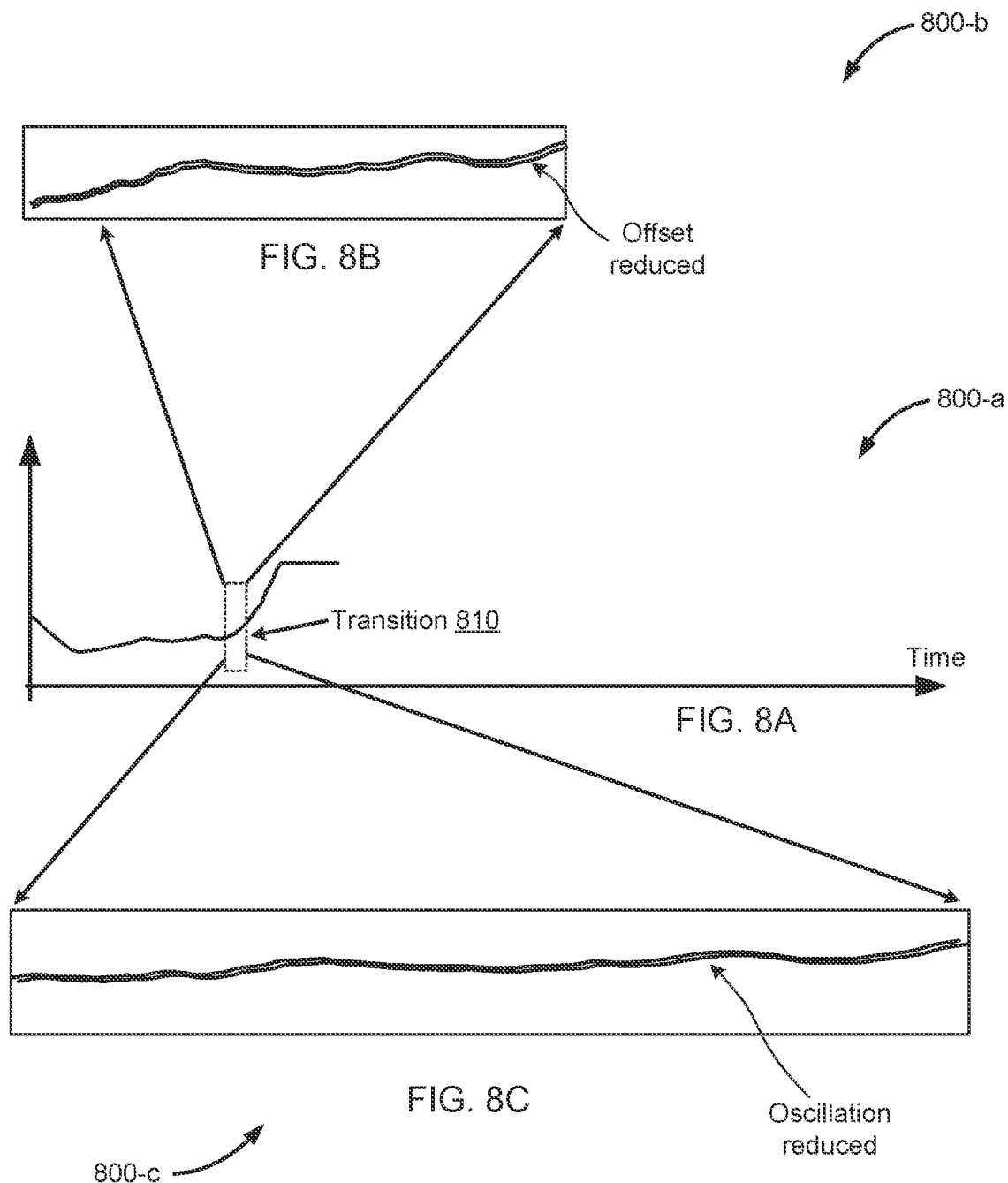
FIGS. 8A-8C depict conceptual graphs of VCM waveforms measured during a transition from a PWM mode to a linear mode, where at least two different PWM frequency and slew rate settings are utilized during operation in the PWM mode, showing the reduction in the transition offset and current oscillations, as compared to the prior art, according to various aspects of the disclosure.

FIGS. 8A-8C depict conceptual graphs 800 of VCM waveforms during a transition from PWM mode to linear mode, where a plurality of PWM mode settings (or frequency-slew rate combinations) are utilized while the VCM is operating in the PWM mode, according to various aspects of the disclosure. In some cases, the PWM-CCL mode transition offset, which may be a steady-state offset between the two modes, introduced from a higher slew rate (e.g., 200 V/μs) may be compensated by changing to a lower slew rate (e.g., 50V/μs) towards the end of the PWM mode. In some cases, the PWM frequency may be the same (e.g., 90 kHz, 120 kHz, 210 kHz) or different for the different slew rates, as described above in relation to FIGS. 2C-7.

Similar to graphs 700-a-c, graph 800-a depicts the VCM voltage against time for a first PWM mode operation utilizing a single VCM PWM frequency/slew combination (e.g., a 210 kHz PWM frequency and a 50 V/μs slew rate) and a second PWM mode operation utilizing two VCM PWM frequency/slew combinations (e.g., 90 kHz-200V/μs for a first duration followed by 210 kHz-50V/μs for a second duration). Further, graph 800-b depicts a zoomed-in view of the transition 810 in FIG. 8A, showing the reduction in the transition/steady-state offset and oscillation in the VCM current achieved by utilizing two or PWM frequency-slew rate combinations instead of a single/static frequency-slew rate.

It should be noted that, the frequency/slew rate combinations and PWM change time discussed in relation to the figures above are exemplary only and not intended to be limiting. They are meant to elucidate the flexibility in the VCM PWM frequency and/or slew rate settings that can be utilized for optimizing power consumption and PES (or RTV) provided in accordance with aspects of the disclosure. Further, while FIGS. 7A-C generally discuss varying the slew rate, this is in no way intended to be limiting. It is contemplated that the VCM PWM frequency may also be varied (i.e., in addition to, or in lieu of, the slew rate).

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry may include a preamp circuit implemented as a separate integrated circuit, integrated into the read channel or data storage controller circuit, or integrated into an SoC.

In some examples, the control circuitry comprises a microprocessor executing instructions, the instructions being operable to cause the microprocessor to perform the flow diagrams described herein. The instructions may be stored in any computer-readable medium. In some examples, they may be stored on a non-volatile semiconductor memory device, component, or system external to the microprocessor, or integrated with the microprocessor in an SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and sub combinations are intended to fall within the scope of this disclosure. In addition, certain method, event or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, an FPGA, a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for optimizing power consumption, RTV, and/or cPES for data storage, and other aspects of this disclosure. Persons skilled in the relevant fields of art will be well-equipped by this disclosure with an understanding and an informed reduction to practice of a wide panoply of further applications, architectures, techniques, and methods for optimizing power consumption, RTV, and/or cPES for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator arm assembly comprising one or more disk heads and a first voice coil motor (VCM), the first VCM configured to operate in a first mode and a second mode, the first mode being different from the second mode, and wherein the first mode corresponds to a plurality of settings, including at least a first setting and a second setting; and
   one or more processing devices configured to:
      cause the first VCM to seek towards a target track in the first mode using the first setting for a first duration;
      control transition of the first VCM from under the first mode using the first setting to the second setting;
      cause the first VCM to seek towards the target track in the first mode using the second setting for a second duration; and
      control transition of the first VCM from under the first mode to a second mode, wherein controlling the transitioning comprises:
         seeking the first VCM toward the target track in the second mode for a third duration; and
         wherein the first duration is longer than one or more of the second duration and the third duration.

2. The data storage device of claim 1, wherein the first mode comprises a pulse width modulation (PWM) mode and the second mode comprises a linear or a current control loop (CCL) mode.

3. The data storage device of claim 2, wherein each of the plurality of settings corresponds to a plurality of parameters, including at least a first parameter and a second parameter.

4. The data storage device of claim 3, wherein the first parameter comprises a PWM frequency, and the second parameter comprises a slew rate of a current applied to or generated by the first VCM.

5. The data storage device of claim 3, wherein each of the plurality of settings corresponds to a different PWM frequency and slew rate combination.

6. The data storage device of claim 3, wherein controlling transition of the first VCM from under the first mode using the first setting to the second setting comprises changing, at or near end of the first duration, at least one of the plurality of parameters of the first setting, wherein at least one of the first and the second parameter of the second setting is different from a corresponding one of the first setting.

7. The data storage device of claim 1, wherein the second duration is longer than the third duration.

8. The data storage device of claim 1, wherein:
   the first mode corresponds to a plurality of transition current offsets, one for each setting; and
   the second mode corresponds to a transition current offset.

9. The data storage device of claim 8, wherein the first setting corresponds to a first transition current offset and the second setting corresponds to a second transition current offset, the second transition current offset different from the first transition current offset, and wherein a difference between the second transition current offset and the transition current offset corresponding to the second mode is less than a difference between the first transition current offset and the transition current offset corresponding to the second mode.

10. The data storage device of claim 1, wherein the first mode comprises a pulse width modulation (PWM) mode, and wherein the second mode comprises a linear or current control loop (CCL) mode, and wherein the one or more processing devices are further configured to:
    select the first setting;
    select the second setting, wherein the second setting is applied to the first VCM after the first setting;
    determine a PWM change time, wherein the PWM change time corresponds to a time at which the first VCM transitions from the first to the second setting for the PWM mode;
    monitor a first track arrival position error signal (PES), the first track arrival PES corresponding to a PES after a first calibration seek using the first setting, the second setting, and the PWM change time, and after the third duration is complete;
    update one or more of the first setting, the second setting, and the PWM change time;
    monitor a second track arrival PES, the second track arrival PES corresponding to a PES after a second calibration seek using one or more of the updated first setting, the updated setting, and the updated PWM change time, and after the third duration is complete; and
    compare the first and the second track arrival PES to determine an optimal PWM change time and optimal first and second settings for the PWM mode.

11. The data storage device of claim 1, further comprising:
    a second VCM, wherein the first VCM is a seeking actuator and the second VCM is a non-seeking actuator;
    and wherein seeking the first VCM towards the target track in the first mode induces a coupled position error signal (cPES) in the second VCM, the cPES based at least in part on a motion of the seeking actuator coupling into the non-seeking actuator.

12. The data storage device of claim 11, wherein the first setting corresponds to a first PWM frequency and first slew rate combination, and the second setting corresponds to a second PWM frequency and second slew rate combination, and wherein the first PWM frequency is lower than the second PWM frequency and the first slew rate is higher than the second slew rate.

13. The data storage device of claim 11, wherein the one or more processing devices are configured to control the second VCM independently of the first VCM.

14. A data storage device comprising:
one or more disks;
an actuator arm assembly comprising one or more disk heads and a first voice coil motor (VCM), the first VCM configured to operate in a pulse width modulation (PWM) mode; and
one or more processing devices, configured to:
perform a calibration routine, wherein performing the calibration routine comprises:
identifying a mapping between pairs of setting values for the PWM mode and a track arrival position error signal (PES), wherein each pair of setting values translates to a current offset applied to the first VCM in the PWM mode,
and wherein the mapping is identified by:
measuring the track arrival PES for different pairs of setting values after seek completion, and incrementally reducing a PWM change time and measuring a corresponding track arrival PES.

15. The data storage device of claim 14, wherein each pair of setting values for the PWM mode comprises a PWM frequency value and a slew rate value of a current applied to or generated by the first VCM.

16. The data storage device of claim 15, wherein identifying the mapping between the pairs of setting values for the PWM mode and the track arrival PES comprises:
selecting a first pair of setting values;
selecting a second pair of setting values;
selecting a first PWM change time, wherein the first PWM change time corresponds to a time at which the first VCM transitions from the first pair of setting values to the second pair of setting values for the PWM mode; and
monitoring a first track arrival PES corresponding to the first and the second pair of setting values and the first PWM change time.

17. The data storage device of claim 14, wherein the one or more processing devices are further configured to:
determine an optimal PWM mode setting, wherein the optimal PWM mode setting corresponds to a lowest track arrival PES measured while measuring the track arrival PES for different pairs of setting values and different PWM change times after seek completion.

18. The data storage device of claim 14, wherein incrementally reducing a PWM change time and measuring the corresponding track arrival PES comprises:
selecting a first pair of setting values;
selecting a second pair of setting values;
selecting an initial PWM change time for operating the first VCM in the PWM mode, wherein the PWM change time corresponds to a time at which the first VCM transitions from the first pair of setting values to the second pair of setting values for the PWM mode;
decreasing the PWM change time by an interval amount; and
measuring the corresponding track arrival PES after each decrease in the PWM change time to identify an optimal PWM change time corresponding to a minimal or no increase in the track arrival PES.

19. The data storage device of claim 14, wherein the one or more processing devices are further configured to:
set initial first and second pairs of setting values;
set an initial PWM change time for operating the first VCM in the PWM mode, wherein the PWM change time corresponds to a time at which the first VCM transitions from using the first pair of setting values to the second pair of setting values for the PWM mode;
adjust one or more of the initial PWM change time, the first pair of setting values, and the second pair of setting values, and measure the corresponding track arrival PES to determine an optimal combination of PWM change time and first and second pairs of setting values for optimizing the track arrival PES; and
calibrate firmware to utilize the optimal combination of PWM change time and first and second pairs of setting values during seek operations.

20. The data storage device of claim 14, wherein the one or more processing devices are further configured to identify the mapping by:
measuring the track arrival PES for one or more of different seek lengths and different directions, the directions selected from a group consisting of an inner diameter (ID) to an outer diameter (OD) direction and an OD to ID direction.

21. The data storage device of claim 14, wherein the first VCM is further configured to operate in a linear mode, and wherein identifying the mapping further comprises:
identifying a mapping of transition current offsets with respect to one or more of pulse width modulation (PWM) frequencies and slew rates for different current levels applied to the first VCM, wherein each transition current offset corresponds to a steady-state offset or error between the PWM mode and the linear mode.

22. The data storage device of claim 14, further comprising:
a second VCM, wherein the first VCM is a seeking actuator and the second VCM is a non-seeking actuator;
and wherein seeking the first VCM towards the target track in the PWM mode induces a coupled position error signal (cPES) in the second VCM, the cPES based at least in part on a motion of the seeking actuator coupling into the non-seeking actuator.

23. The data storage device of claim 22, wherein each pair of setting values for the PWM mode comprises a PWM frequency value and a slew rate value of a current applied to or generated by the first VCM, and wherein the one or more processing devices are further configured to:
select a first pair of setting values, the first pair of setting values corresponding to a first PWM frequency value and a first slew rate value;
select a second pair of setting values, the second pair of setting values corresponding to a second PWM frequency value and a second slew rate value; and
select a first PWM change time, wherein the first PWM change time corresponds to a time at which the first VCM transitions from the first pair of setting values to the second pair of setting values for the PWM mode to reduce or minimize the cPES induced in the second VCM; and
wherein the first PWM frequency value is lower than the second PWM frequency value and the first slew rate value is higher than the second slew rate value.

24. The data storage device of claim 22, wherein the one or more processing devices are configured to control the second VCM independently of the first VCM.

25. A method of operating a data storage device, comprising:
   actuating, by one or more processing devices, a first voice coil motor (VCM);
   causing the first VCM to seek towards a target track in a first mode using a first setting for a first duration;
   controlling transition of the first VCM from under the first mode using the first setting to a second setting, the first setting being different from the second setting, and wherein the first setting corresponds to a first transition current offset and the second setting corresponds to a second transition current offset;
   causing the first VCM to seek towards the target track in the first mode using the second setting for a second duration; and
   controlling transition of the first VCM from under the first mode to a second mode, wherein controlling the transition comprises seeking the first VCM toward the target track in the second mode for a third duration.

26. The method of claim 25, wherein the first mode comprises a PWM mode, and the second mode comprises a linear mode, and wherein each of the first and the second transition current offsets is a steady-state offset between the PWM and linear modes.

27. The method of claim 25, wherein the data storage device further comprises a second VCM, wherein the first VCM is a seeking actuator and the second VCM is a non-seeking actuator;
   and wherein seeking the first VCM towards the target track in the first mode induces a coupled position error signal (cPES) in the second VCM, the cPES based at least in part on a motion of the seeking actuator coupling into the non-seeking actuator; and
   wherein the first setting corresponds to a first PWM frequency and first slew rate combination, and the second setting corresponds to a second PWM frequency and second slew rate combination, and wherein the first PWM frequency is lower than the second PWM frequency and the first slew rate is higher than the second slew rate.

28. One or more processing devices comprising:
   means for actuating a voice coil motor (VCM);
   means for causing the VCM to seek towards a target track in a first mode using a first setting for a first duration;
   means for controlling transition of the VCM from under the first mode using the first setting to a second setting, the first setting being different from the second setting, and wherein the first setting corresponds to a first transition current offset and the second setting corresponds to a second transition current offset;
   means for causing the VCM to seek towards the target track in the first mode using the second setting for a second duration; and
   means for controlling transition of the VCM from under the first mode to a second mode, and wherein the means for controlling transition of the VCM comprises means for seeking the VCM toward the target track in the second mode for a third duration.

29. The one or more processing devices of claim 28, wherein the first mode comprises a PWM mode, and the second mode comprises a linear mode, and wherein each of the first and the second transition current offsets is a steady-state offset between the PWM and linear modes.

30. A data storage device, comprising:
   one or more disks;
   an actuator arm assembly comprising one or more disk heads and a first voice coil motor (VCM), the first VCM configured to operate in a first mode and a second mode, the first mode being different from the second mode, and wherein the first mode corresponds to a plurality of settings, including at least a first setting and a second setting;
   a second VCM, wherein the first VCM is a seeking actuator and the second VCM is a non-seeking actuator; and
   one or more processing devices configured to:
      cause the first VCM to seek towards a target track in the first mode using the first setting for a first duration, wherein seeking the first VCM towards the target track in the first mode induces a coupled position error signal (cPES) in the second VCM, the cPES based at least in part on a motion of the seeking actuator coupling into the non-seeking actuator;
      control transition of the first VCM from under the first mode using the first setting to the second setting;
      cause the first VCM to seek towards the target track in the first mode using the second setting for a second duration; and
      control transition of the first VCM from under the first mode to a second mode, wherein controlling the transitioning comprises:
         seeking the first VCM toward the target track in the second mode for a third duration.

* * * * *